United States Patent [19]
Watkins

[11] Patent Number: 5,937,436
[45] Date of Patent: Aug. 10, 1999

[54] NETWORK INTERFACE CIRCUIT INCLUDING AN ADDRESS TRANSLATION UNIT AND FLUSH CONTROL CIRCUIT AND METHOD FOR CHECKING FOR INVALID ADDRESS TRANSLATIONS

[75] Inventor: John E. Watkins, Sunnyvale, Calif.

[73] Assignee: Sun Microsystems, Inc, Mountain View, Calif.

[21] Appl. No.: 08/674,095

[22] Filed: Jul. 1, 1996

[51] Int. Cl.[6] ............................. G06F 12/10; G11C 15/00
[52] U.S. Cl. ......................... 711/202; 711/108; 711/135; 711/203; 711/210
[58] Field of Search .................................... 711/135, 133, 711/202, 206, 207, 208, 210, 203, 108

[56] References Cited

U.S. PATENT DOCUMENTS

| 4,488,256 | 12/1984 | Zolnowski et al. | 711/210 |
| 5,606,683 | 2/1997 | Riordan | 711/207 |
| 5,675,763 | 10/1997 | Mogul | 711/203 |
| 5,682,495 | 10/1997 | Beavers et al. | 711/207 |
| 5,784,709 | 7/1998 | McLellan et al. | 711/108 |

FOREIGN PATENT DOCUMENTS

| 2 221 066 | 6/1988 | United Kingdom . |
| 96 12231 | 4/1996 | WIPO . |

OTHER PUBLICATIONS

"Testability Features of the MC68851 PMMU", Giles et al., *Proceedings of the Interntional Test Conference* 1986, Sep. 8, 1986, Washington, p.408–411.

*Primary Examiner*—Glenn Gossage
*Attorney, Agent, or Firm*—Blakely Sokoloff Taylor & Zafman

[57] ABSTRACT

A network interface circuit including an address translation unit and a flush check circuit, and a method for checking for an invalid address translation within of the address translation unit, are disclosed. A flush check circuit, in communication with the address translation unit, is implemented to determine, prior to loading an address translation into the internal memory, whether one of the plurality of entries already contains a virtual address utilized by the address translation. If so, an error has occurred with the flushing operations of the address translation unit because the address translation should have already been removed. In response, the flush check circuit signals logic to perform error handling techniques such as issuing an error signal, storing the invalid address translation unit, or transmitting the virtual address of the address translation without loading that address translation. The memory of the address translation unit may include a content addressable memory (CAM) element configured to contain the virtual page number of an address translation, and a random access memory (RAM) element configured to contain a physical page number of that address translation. In one embodiment, the flush check circuit may include flush management logic to detect whether a flush check mode is enabled via a control register.

19 Claims, 7 Drawing Sheets

NETWORK INTERFACE CIRCUIT INCLUDING AN ADDRESS TRANSLATION UNIT AND FLUSH CONTROL CIRCUIT AND METHOD FOR CHECKING FOR INVALID ADDRESS TRANSLATIONS

CROSS-REFERENCES TO RELATED APPLICATIONS

The named inventor of the present application has concurrently filed a number of United States Patent Applications that are co-pending with the subject Application. These United States Patent Applications are entitled "Asynchronous Transfer Mode (ATM) Segmentation And Reassembly Unit Virtual Address Translation Unit Architecture" (application Ser. No. 08/672,982); "A Circuit And Method For Replacement Of Address Translations" (application Ser. No. 08/673,004), "A Circuit And Method For Segregating Memory In An Address Translation Unit" (application Ser. No. 08/673,050); and "Data Buffer Prefetch Apparatus and Method" (application Ser. No. 08/675,263, now U.S. Pat. No. 5,854,911).

BACKGROUND OF THE INVENTION

1. Field of the Invention

The present invention relates to the field of data transfer. More particularly, the present invention relates to a circuit and method for replacing address translations contained in an address translation unit.

2. Description of Art Related to the Invention

For over a decade, a number of system architectures have been developed with input/output ("I/O") devices accessing main memory through direct virtual memory accesses (DVMAs) using virtual addresses, instead of direct memory accesses ("DMAs") using physical addresses. One advantage associated with DVMA systems has been the simplification of data accesses by the I/O device. For example, I/O devices accessing memory through DMAs ("DMA I/O devices") must be controlled to "scatter" (or allocate) data to a number of potentially discontiguous physical pages as well as to "gather" data. Gathering data that exceeds one page in length is normally accomplished by accessing a group of discontiguous physical pages. In contrast, I/O devices that access main memory through DVMAs ("DVMA I/O devices") do not require such control because data accesses are made through contiguous virtual pages.

Although the DVMA systems have simplified this "scatter-gather" problem, these systems require the virtual addresses issued by the DVMA I/O devices to be translated into physical addresses before data can be accessed from main memory. As shown in FIG. 1, a conventional DVMA system 100 utilizes an I/O Memory Management Unit "I/O MMU" 110, sometimes referred to as an I/O Translation Lookahead Buffer, to translate virtual addresses to physical addresses utilized by main memory 120. As shown, the I/O MMU 110 is implemented within a bridge element 130 that couples an I/O bus 140 and a system bus 150.

Typically, the I/O MMU 110 is often configured to contain a limited number "r" of address translations to increase system performance with minimal additional costs. Thus, a plurality of I/O DVMA devices $160_1$–$160_i$ ("i" being a whole number, $i \geq 2$) are restricted to collectively use at most "r" virtual pages without mitigating system performance. If a requested address translation is not contained within the I/O MMU 110, resulting in an I/O MMU "miss", the requested address translation must be fetched from main memory 120 which contains all potential address translations. Of course, such fetching reduces system performance.

With the emergence of multi-media communications, networks are now being required to support multiple data types. As a result, network manufacturers are tending to concentrate their efforts toward asynchronous transfer mode ("ATM") networks. In ATM networks, a large number of virtual channels, perhaps hundreds, can be in operation simultaneously. Hence, if the DVMA system 100 is configured to support an ATM network coupled to I/O network interface logic 170, it would experience significant performance degradation caused by excessive fetching of address translations from main memory.

To substantially avoid performance degradation, an address translation unit ("ATU") may be implemented within a Network Interface Circuit (or Cord) ("NIC"). The ATU would contain a set of virtual-to-physical address translations, thereby providing an ability to bypass the I/O MMU. These address translations are modifiable, and thus, would require a "flush" operation scheme to remove address translations that no longer reflect current or active translations. This is necessary to maintain coherency.

Although system software normally has the responsibility of issuing and controlling flush operations, it requires intensive system and code analysis to remove code related to superfluous flush operations or to add code to support requisite flush operations that were not previously coded. Such intensive system and code analysis is prevalent, especially during development and initial placement in the market when flaws in performance can have substantial adverse effects on the success of the product.

Hence, it would be advantageous to develop hardware circuitry to at least assist system software by checking for the existence of a particular virtual page in the ATU before loading a new address translation for that page. This circuitry would detect missed software flush operations, which would be especially useful during system software development.

SUMMARY OF THE INVENTION

The present invention relates to a flush check circuit which is configured to determine, prior to loading an address translation into an address translation unit, whether a virtual page number associated with the address translation is still contained in memory of an address translation unit. This flush check circuit assists system software to detect missed software flush operations. Such operations would be especially useful during system software development.

BRIEF DESCRIPTION OF THE DRAWINGS

The features and advantages of the present invention will become apparent from the following detailed description of the present invention in which.

DESCRIPTION OF THE PREFERRED EMBODIMENT

In the following detailed description, the present invention describes circuitry and a method for maintaining and ensuring coherency of address translations contained in an address translation unit ("ATU"), preferably implemented on a Network Interface Card ("NIC"). The NIC is adapted to an I/O bus of an electronic system to interconnect the electronic system to an asynchronous transfer mode ("ATM") network supporting a plurality of virtual channels.

A number of terms are frequently used herein to describe certain control circuits and binary representations which are defined herein. A "word" is preferably 4 bytes (32-bits) in length, but may be any "$2^x$" byte in length (where $x \geq 0$). A "packet" is a plurality of words stored, transmitted or received in succession. An "address translation" is a mapping between a virtual address and a physical address. A "flush" operation is a removal of an address translation from one or more storage locations. The term "asserted" is defined as the activation or setting of a preselected logic value. Moreover, a "virtual address" may be construed as the entire virtual address or a portion thereof (e.g., a virtual page number). Likewise, a "physical address" may be construed as the entire physical address or a portion thereof (e.g., a physical page number).

Figure 1:
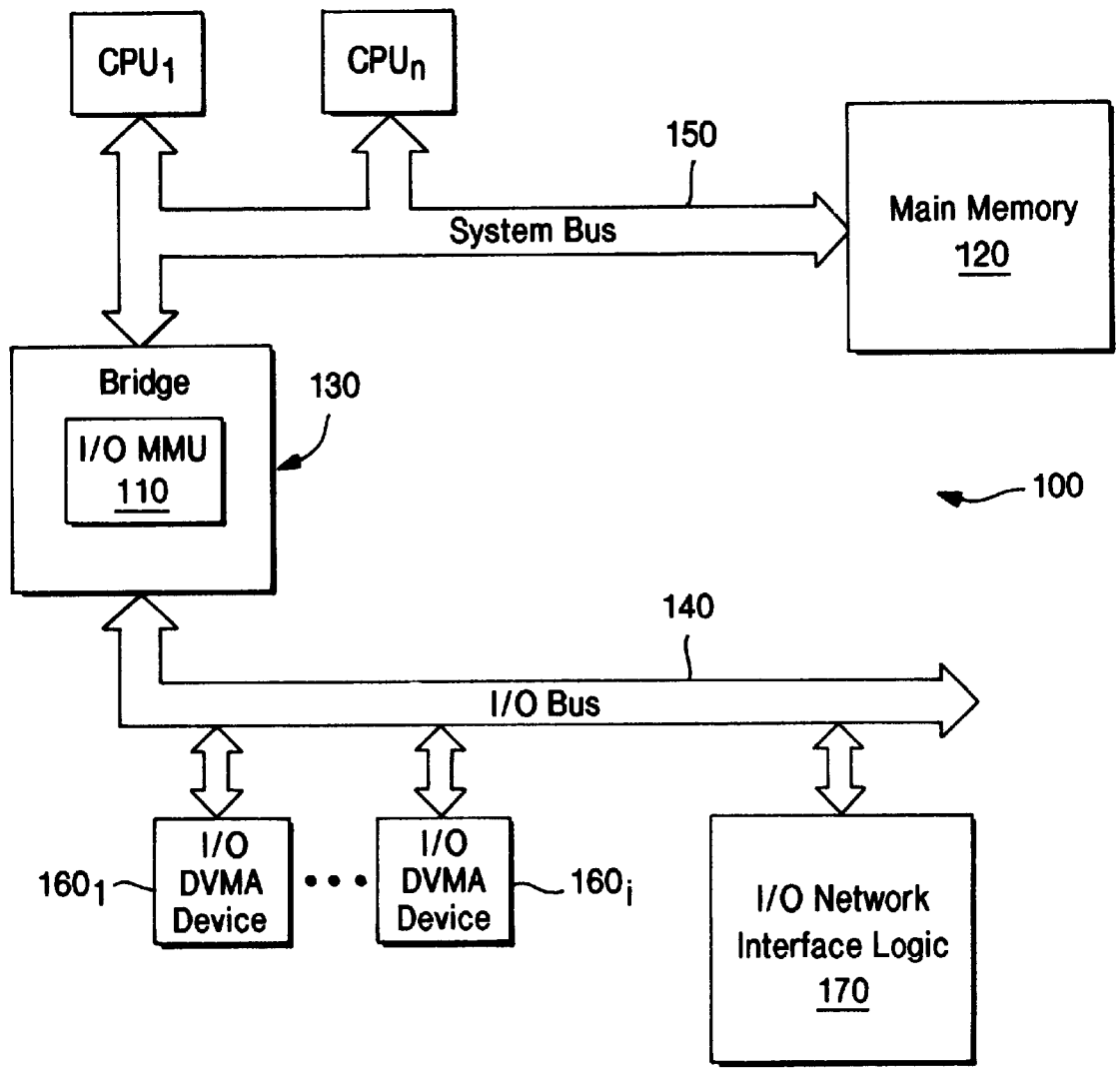
FIG. 1 is a block diagram of a conventional DVMA system including an I/O Memory Management Unit employed within a bridge element.
Figure 2A:
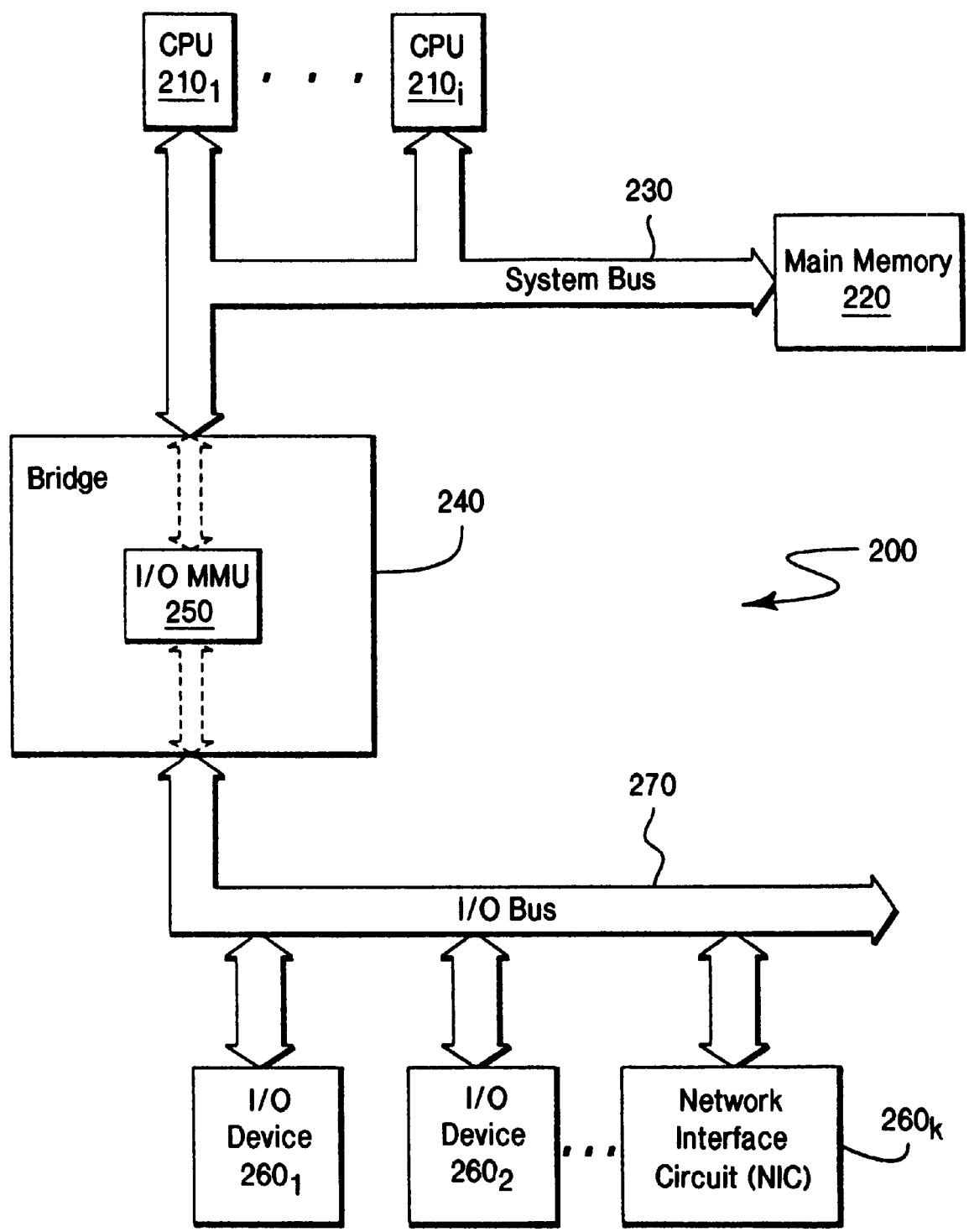
FIG. 2A is a block diagram of an embodiment of an electronic system including an I/O Memory Management Unit employed within the bridge element and an address translation unit ("ATU") employed within a Network Interface Circuit (or Cord) ("NIC").

Referring to FIG. 2A, an embodiment of an electronic system 200 such as, for example, a workstation manufactured by Sun Microsystems of Mountain View, Calif., is illustrated. The electronic system 200 operates as a DVMA system, although it is contemplated that the present invention may function in conjunction with a DMA type system.

As shown, the electronic system 200 comprises one or more microprocessors $210_1$–$210_j$ ("j" being a whole number, $j \geq 1$) coupled to main memory 220 through a system bus 230 to enable communications therebetween. The system bus 230 is further coupled to a bridge element 240, including an I/O MMU 250, to enable communications between components coupled to the system bus 230 (e.g., main memory 220, microprocessor(s) $210_1$–$210_j$, etc.) and a plurality of I/O devices $260_1$–$260_k$ ("k" being a whole number, $k \geq 2$) coupled to an I/O bus 270. The I/O bus 270 may include, but is not limited to, a Peripheral Component Interconnect ("PCI") bus developed by Intel Corporation of Santa Clara, Calif. For example, the PCI bus may support 64-bit address/data propagation at approximately 66 megahertz ("MHz") or 32-bit address/data propagation at approximately 33 MHz.

Although not shown, the main memory 220 includes a plurality of free memory buffers, a Receive ("RX") descriptor ring and a RX Completion ring to support RX operations (not shown). Likewise, there are similar elements to support Transmit ("TX") operations. Normally, the buffers are storage locations consecutively addressed in virtual memory, but are not necessarily contiguous in physical memory. The buffers may be of various sizes, occupying one or more virtual pages. Each descriptor ring includes a plurality of descriptors, one of these descriptors being shown in FIG. 2B.

Figure 2B:
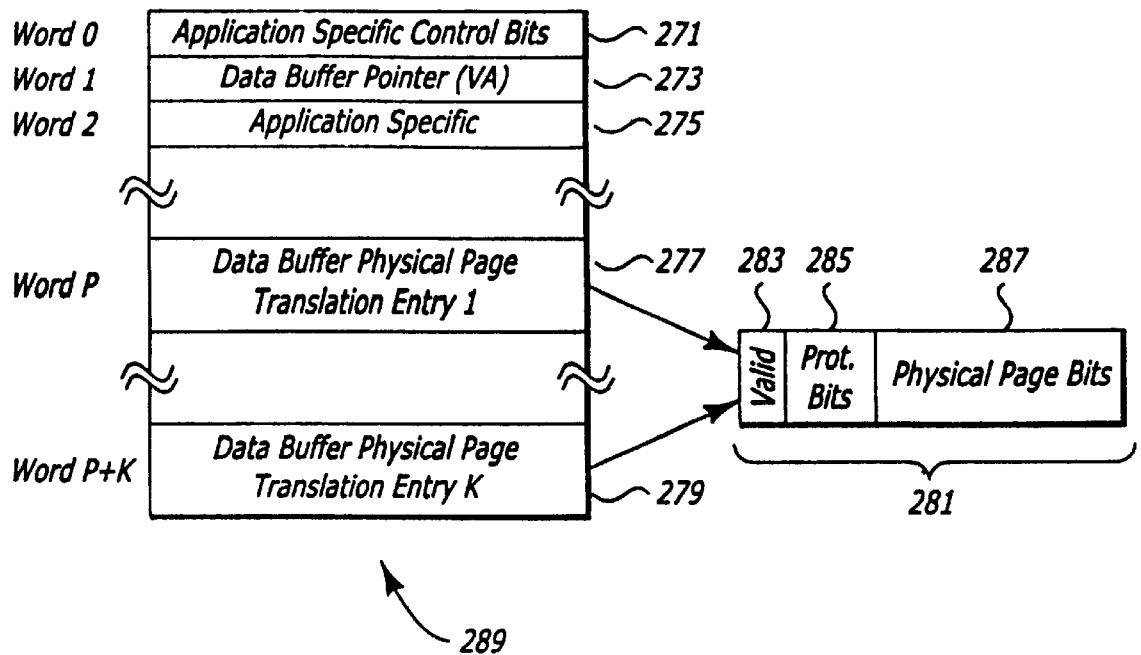
FIG. 2B is a block diagram of an embodiment of a data structure of a descriptor from a descriptor ring stored in main memory of the electronic system of FIG. 2A.

Referring now to FIG. 2B, a sample descriptor format 289, which is a basic data structure that can be used by a Segment and Reassembly ("SAR") unit to transport packet data between main memory 220 and the network, is shown. In one embodiment, descriptors are arranged (64 bytes apart between each descriptor) in a ring structure (which is not shown). These descriptors point to a set of data packets to be sent to the network (in the transmit case) or the descriptors point to a set of free memory buffers to hold incoming packets (in a receive case). In one embodiment, each descriptor is of a fixed length and comprises a plurality of words, ranging between three and sixteen contiguous 32-bit words. The descriptors are placed consecutively in virtual memory in a ring structure. Each of these descriptors, which are located in main memory, point to a data buffer (in the transmit ("TX") case) which is also located in main memory.

As shown in block 271 of the descriptor 289, word 0 contains application specific control bits. Block 273 illustrates that word 1 contains a virtual address ("VA") pointer which points to the beginning of a data buffer. Block 275 shows that word 2 of the descriptor 289 contains application specific information. The end of the block 277 and 279 contains information on the physical page location of the physical address ("PA") that maps to the virtual address contained in block 273 and associated with this descriptor 289. Block 277 illustrates that word "P" contains a translation entry 1 for the first physical page. Each physical page of the physical address contains its own entry. In one embodiment, the last word "P+K", where "P" is a predetermined number greater than 2, and "K" is equal to the number of pages the data buffer spans −1 as illustrated by block 279. If a data buffer spans ten pages, then there will be ten translation entries at the end of descriptor 289. Thus, caching the physical address of objects greater than one page size is supported by embedding multiple translations within a descriptor.

A sample physical translation format 281 is also shown in FIG. 2B. In one embodiment, this format 281 includes a valid bit 283, protection bits 285 and the actual physical page bits 287. The valid bit 283, in the descriptor, determines if a specific translation entry will be placed into the ATU (if valid bit 283 is set) or ignored (if valid bit 283 is cleared). The protection bits 285 are transferred through control line 560 of FIG. 5 in determining whether a page is accessible using the ATU's physical translation for the virtual address. For instance, a read-only page can be protected from writes with a read only page protection bit. The physical page bits 287 provide the virtual to physical address mapping for the corresponding portion of the data buffer in virtual address space. The data buffer pointed to by the data buffer pointer 273 can span one or more virtual pages and are not necessarily contiguously placed in physical memory.

Figure 3:
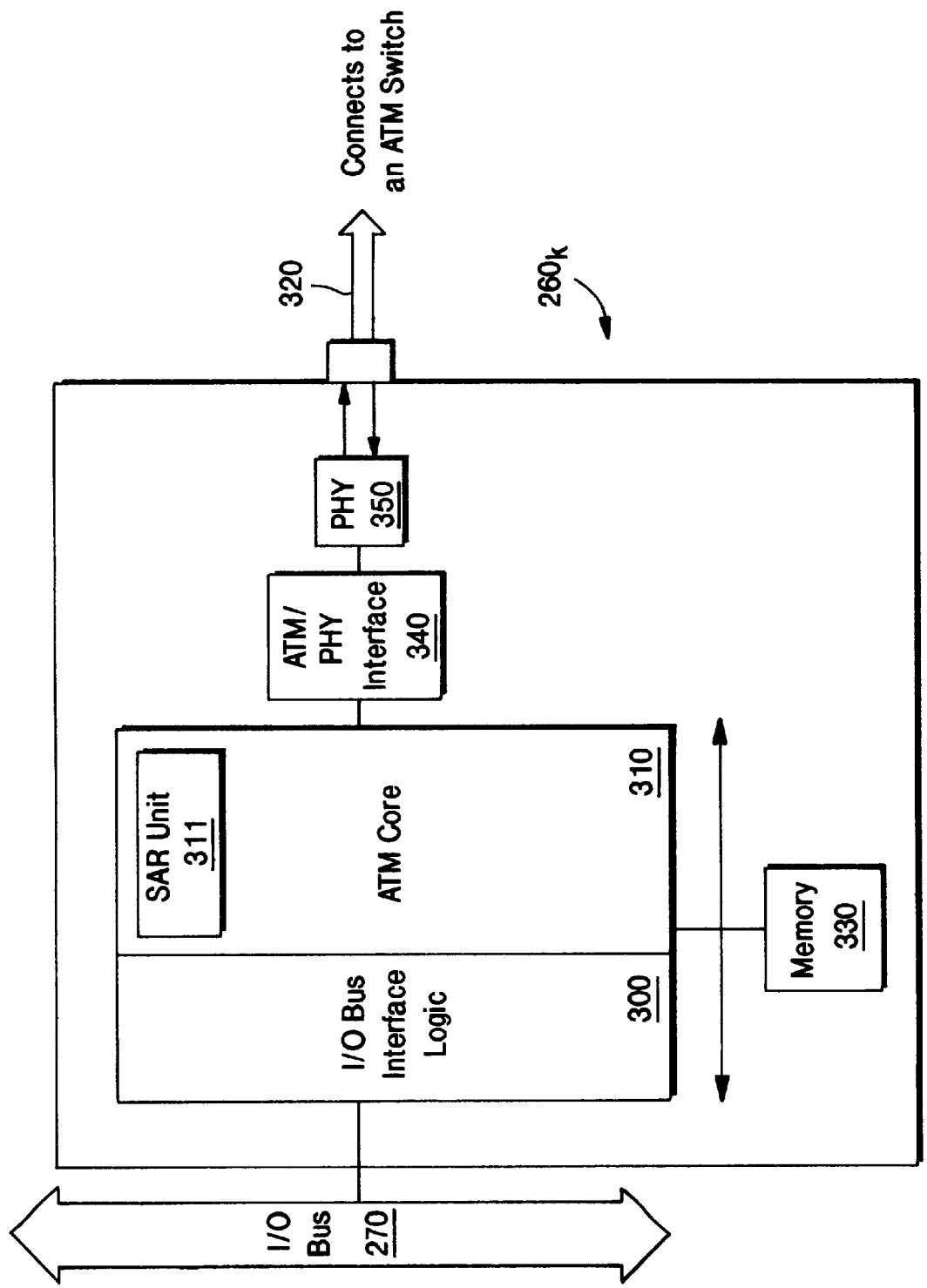
FIG. 3 is a block diagram of a general embodiment of a NIC interconnecting communication medium of a network and an I/O bus of a workstation coupled to the network.

Referring to FIG. 3, one of the plurality of I/O devices, for example I/O device $260_k$, comprises a Network Interface Circuit (or Cord) ("NIC"). The NIC $260_k$ includes I/O bus interface logic 300 and an ATM core 310, both of which collectively operate to transfer data between the electronic system and other remotely located electronic systems through multiple virtual channels normally utilizing full duplex media 320. The media 320 may include optical fiber, twisted pair or any other high speed communication medium normally supporting a transfer rate of 155 million bits per second ("Mbps"), 622 Mbps, or even at speeds faster than 622 Mbps.

The ATM core 310 features a segmentation and reassembly ("SAR") unit 311 which facilitates segmentation and reassembly of data cells (e.g., a standard ATM cell absent a checksum byte) and utilizes off-chip memory 330 for storage. The ATM core 310 exchanges data cells with an ATM/physical (PHY) interface 340 conforming to the well-known Universal Test and Operations Physical Interface for ATM ("UTOPIA") standard. The ATM/physical interface 340 is positioned to insert a checksum in a header of an out-going data cell to produce an ATM cell or to calculate whether the checksum of an in-coming ATM cell is correct, and if so, removing the checksum before transferring the data cell into the ATM core 310. A physical layer 350 is implemented for proper electrical voltage line termination. A description of the ATM core may be found in a U.S. patent entitled "Method and Apparatus for Coordinating Data Transfer Between Hardware and Software by Comparing Entry Number of Data to be Transferred Data to Entry Number of Transferred Data" (U.S. Pat. No. 5,675,829, issued Oct. 7, 1997. That U.S. patent is owned by Assignee of the present application.

For ATM cell transmission, the ATM core 310 is initially provided a starting location of the TX descriptor ring. The ATM core 310 fetches the first TX descriptor to obtain the virtual address of the data buffer associated with the first TX descriptor. Next, the data buffer is accessed to propagate data into the SAR unit 311 for segmentation into one or more ATM cells transmitted through the physical media 320. After transmission of the ATM cell(s) (or at least storage of the data in local buffers of SAR unit 311), the SAR unit 311 may acknowledge completion by writing status information to the TX completion descriptor ring and generating an interrupt to the system to alert the processor accordingly.

During reception, incoming ATM cells are reassembled into packets of data which are subsequently stored in free memory buffers indicated by a virtual address pointer contained in its corresponding RX descriptor.

Figure 4:
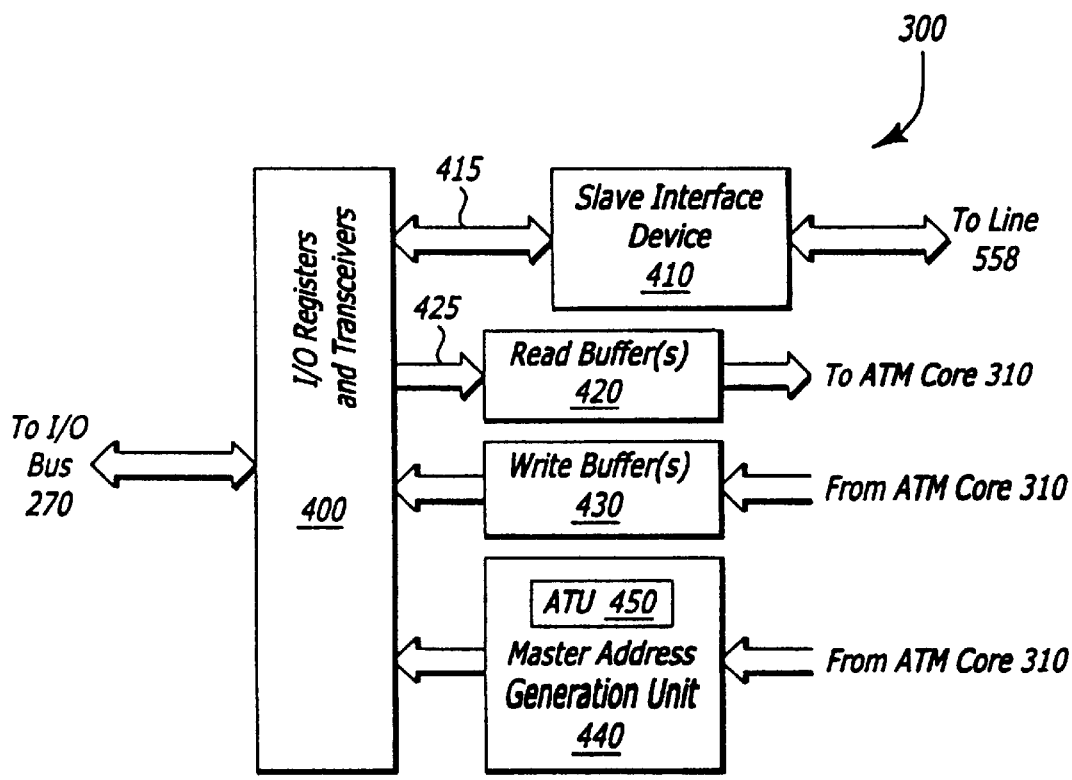
FIG. 4 is a block diagram of one embodiment of the I/O bus interface logic including an address translation unit.
Figure 5:
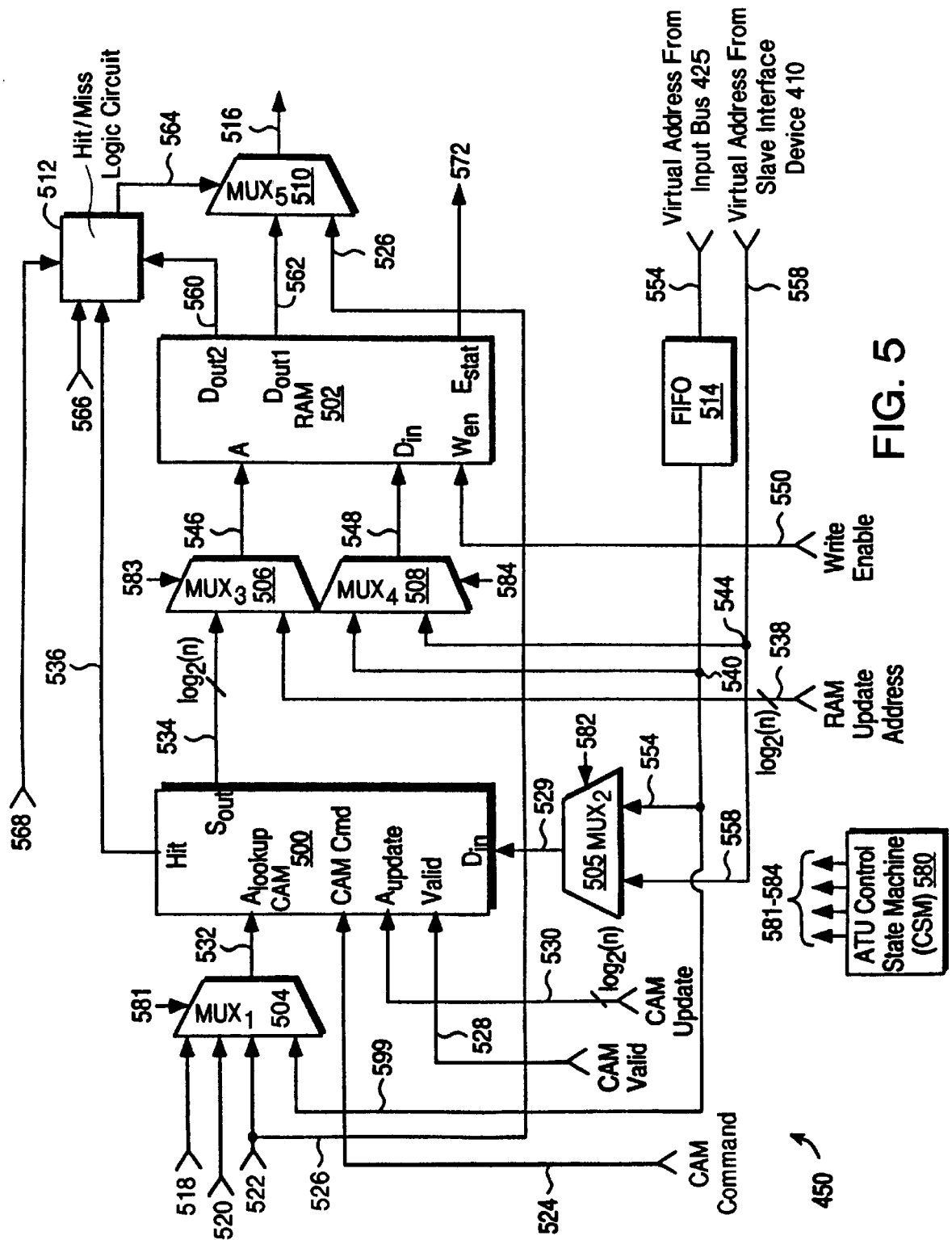
FIG. 5 is a block diagram of a preferred embodiment of the address translation unit ("ATU") of FIG. 4.

Referring now to FIG. 4, an embodiment of the I/O bus interface logic 300 coupled to the I/O bus 270 (e.g., PCI bus with a 64-bit address/data lines operating at approximately 66 MHz for this embodiment) is shown. The I/O bus interface logic 300 includes I/O registers and transceivers 400 (e.g., PCI I/O registers and transceivers) coupled to a slave interface device 410 via an I/O bus line 415. The slave interface device 410 may include an ATU control register (not shown) used to control various features of the ATU. Moreover, the I/O bus interface logic 300 includes one or more read buffers 420 via an input bus 425, as well as one or more write buffers 430, and a master address generation unit 440. Although not shown, the input bus 425 is further coupled to the master address generation unit 440, namely a FIFO storage element as shown in FIG. 5, to receive descriptor related information. The read buffer(s) 420 is (are) used to temporarily store information from the I/O bus 270 while the write buffer(s) 430 is (are) used to temporarily store information via a write data path from the SAR unit.

Implemented within the master address generation unit 440 is an address translation unit ("ATU") 450 that receives information from the SAR unit 311 of the ATM Core. This information includes the virtual address to be translated, the size of the address and the type of access (e.g., access to descriptor ring or buffer). The presence of the ATU 450 allows the electronic system to (i) translate the virtual address into a physical address and subsequently bypass the I/O MMU 250 of FIG. 2A, or (ii) transmit the virtual address to the I/O MMU 250 of FIG. 2A.

Referring now to FIG. 5, an embodiment of the ATU 450 is shown. The ATU 450 may be configured to be fully associative. However, it is contemplated that another memory access scheme, such as direct mapped or N-way associative, may be utilized in order to meet a desired translation hit rate.

The ATU 450 includes a content addressable memory ("CAM") element 500 and random access memory ("RAM") element 502, which collectively contain "n" address translations ("n" being a whole number, $n \geq 1$). More specifically, the CAM element 500 includes logic that supports loading of a virtual address and control information in one of "n" entries as well as performing address lookup searches of the entries. The control information may include a CAM Valid bit indicating, when set, that the entry contains a virtual address currently being used for address translations. The CAM element 500 further includes (i) a plurality of input ports and (ii) a plurality of output ports.

The plurality of input ports are used to load address and control information into the entries of the CAM element 500. As shown, there are five (5) input ports used to load information into the CAM element. The first input port is a data input ("$D_{in}$") port used for loading a selected virtual address provided by a select element (e.g., multiplexer (MUX) 505) via address lines 529. The second input port is an address update ("$A_{update}$") port for receiving, via CAM Update address lines 530 an entry number of the entry selected to be loaded with the virtual address on the data lines 529. The third input port is a command ("CAM command") port from which the CAM element 500 receives command information to control its operation via command lines 524. Types of commands include, but are not limited to "Translate" or "Update". In addition, the fourth input port is an entry valid ("Valid") port through which a control line 528, representative of the CAM Valid bit of an entry addressed by the $A_{update}$ port, is asserted or de-asserted depending on if the entry is "valid" (e.g., in a "valid" state or currently being used), or "invalid" (e.g., in an "invalid" state or stale). The fifth input port is an address lookup ("$A_{lookup}$") port from which the CAM element 500 receives a virtual address (e.g., page number) via lookup address lines 532 to be compared with the virtual addresses stored in each of its entries. If a match occurs, an output ("Hit") port and its control line (referred to as "CAM_Hit" 536) is asserted (i.e., an active signal is produced). As a result, a signal out ("$S_{out}$") port propagates the entry number of the CAM entry containing the virtual address through signal lines 534.

Referring still to FIG. 5, the RAM element 502 is configured to contain the corresponding physical address for the virtual address stored in CAM element 500. Similar to the CAM element 500, the RAM element 502 includes a plurality of input and output ports. More particularly, the RAM element 502 includes a data input ("$D_{in}$") port used for loading, via data lines 548, a physical address corresponding to the virtual address loaded into the CAM element 500. The RAM element 502 further includes an address ("A") port for entry lookups and entry updates. A write enable ("$W_{en}$") port is used to distinguish between an entry update (e.g., $W_{en}$ line 550 being asserted) and entry lookup (e.g., $W_{en}$ line 550 being de-asserted). In addition, the RAM element 502 includes a first data out ("$D_{out1}$") port to output the physical address corresponding to the virtual address being translated or searched, via address lines 562 and a second data out ("$D_{out2}$") port to output write protection information contained in the selected entry via control line 560. Moreover, the RAM element 502 includes an entry status ("$E_{stat}$") port to provide information indicating which entries of the CAM and RAM elements have been accessed via Entry status lines 572.

In addition to the CAM and RAM elements 500 and 502, the ATU 450 further includes a first group of control logic that controls the loading and flushing of the address translations, and a second group of control logic that controls whether the ATU 400 should output a virtual or physical address via address lines 516. An indicator used to bypass I/O MMU may include, but is not limited to, a high order address bit being set or cleared, a specific subset of the address space being accessed, etc. For example, in one embodiment, the bridge element 240 such as that shown in FIG. 2A provides an address range within the 64-bit address space which when accessed treats the lower 41 bits of the address as a physical address.

As shown, the first group of control logic includes a plurality of select elements 504–506 and 508 (e.g., multiple input multiplexers), and a first-in, first-out ("FIFO") storage element 514. The FIFO storage element 514 is used to temporarily store virtual/physical address translations as they are read from the input bus 425 during descriptor fetches.

The plurality of select elements 504–506 and 508 are controlled by ATU control state machine ("ATUCSM") 580 through control lines 581–584. A first select element 504 is coupled to the $A_{lookup}$ port of the CAM element 500 via lookup address lines 532 in order to route the virtual address to be searched within the CAM element 500. This select element receives as input virtual addresses (or virtual page numbers) through software flush address lines ("SW Flush address lines") 518, hardware flush address lines, ("HW Flush address lines") 520 and address lines 522 for usual translation loading. The second select element 505 is coupled to the $D_{in}$ port of the CAM element 500 via data lines 529 to load either a (i) virtual address obtained from a descriptor fetch via lines 554, or alternatively, (ii) a virtual address of a data buffer specified manually by software writing the buffer's virtual address into CAM element 500. This is an access of the slave interface device 410 (FIG. 4) resulting in that virtual address being placed on lines 558. A third select element 506 is coupled to the address port of RAM 502 (of CAM 500) via address lines 546 to transmit therein either a RAM Update address via a RAM Update address line 538 or an entry number output from the CAM element 5000 through the $S_{out}$ port via signal lines 534. The fourth select element 508 is coupled to the $D_{in}$ port of RAM 502 (of CAM 500) via address lines 548 to input physical addresses and control information from lines 540 and 544.

The second group of control logic includes a hit/miss logic circuit 512 and a fifth select element 510. The hit/miss logic circuit 512 is combinatorial logic configured to control whether the fifth select element 510 outputs onto the address lines 516 (i) a translated physical address received from lines 562 or (ii) the virtual address for lines 526 to be subsequently translated by the I/O MMU. Such control is performed by the assertion or de-assertion of an ATU_Hit control line 564.

The translated physical address is output from the fifth select element 510 under all conditions unless (i) the CAM_Hit line 536 is not asserted thereby indicating a "lookup miss", (ii) the ATU 450 is disabled by System software not asserting an ATU enable line 566, (iii) a cycle status line 568 is not asserted indicating that this particular translation should be avoided, or (iv) the protection bits 560 signify that the cycle in progress is prohibited due to reasons including, but not limited to, an attempted write access of a read-only page.

Since the ATU 450 is implemented with memory supporting a limited number of address translations which are modifiable, it would be advantageous to implement circuitry to support a number of functions, including but not limited to, (i) assisting system software by checking the existence of a particular virtual page in the ATU before loading a new translation with that page; (ii) self-verification that it has invalidated an entry associated with a particular virtual page before loading a new address translation associated with that particular page; and (iii) reporting missed flush operations or entry invalidations via interrupt or status register polling.

Figure 6:
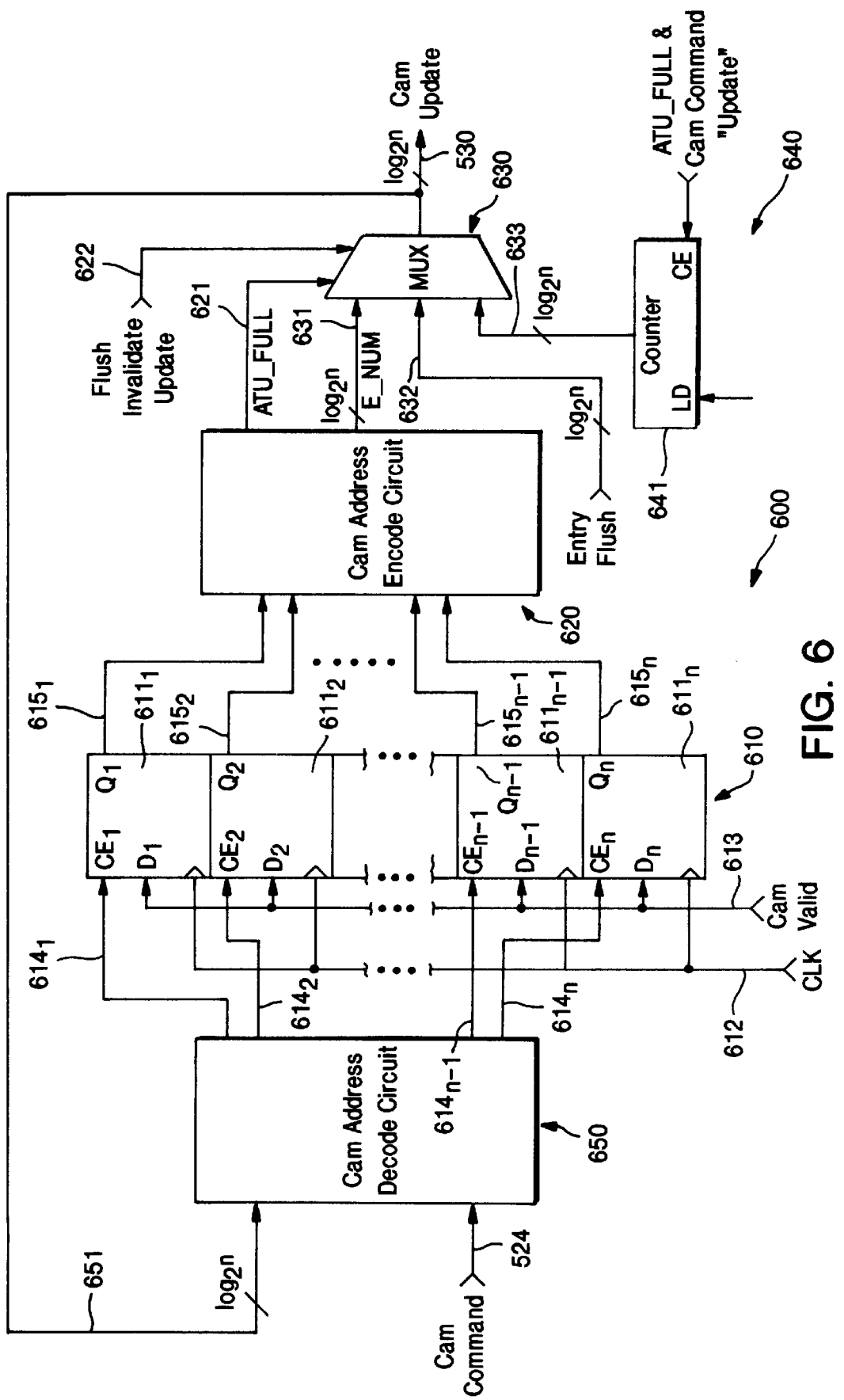
FIGS. 6–7 are block diagrams of portions of an ATU control state machine that control replacement of address translations for entries of the ATU of FIG. 5.

Referring now to FIG. 6, a preferred embodiment of the update control circuit 600 within ATU CSM 580 is shown, wherein the update control circuit 600 comprises an ATU replacement element 610, a CAM Address Encode circuit 620, a select element 630, an increment circuit 640 and a CAM Address Decode circuit 650. The update control circuit 600 is coupled to the CAM Update Address control lines 530 to select which entry of the CAM element is to be loaded with a virtual address from either the I/O bus line 415 or the input bus 425 of FIGS. 4 and 5. It is contemplated, however, that the RAM Update address lines 538 may be coupled to the CAM Update address lines 530 in order to receive the same entry number selections to maintain operation coherency.

The ATU replacement element 610 is a plurality of storage elements (e.g., "n" storage elements $611_1$–$611_n$), each storage element uniquely corresponding to one CAM entry. As shown in FIG. 6, each of the plurality of storage elements $611_1$–$611_n$ is implemented as a 1-bit register being clocked at a predetermined frequency "CLK" through clock line 612. It is contemplated, however, that the storage elements $611_1$–$611_n$ may include other types of storage devices besides 1-bit registers.

When one of a plurality of clock enable control lines $614_1$, ..., or $614_n$ (e.g., clock enable control line $614_1$) is asserted by the CAM Address Decode circuit 650, a storage element associated with the clock enable control line (e.g., storage element $611_1$) is "set" by loading a CAM Valid bit value therein. The CAM Valid bit value (e.g., a logic "1") is loaded via a data input line 613 in order to represent that the CAM and RAM entries, corresponding to the storage element, contain a valid address translation. Thus, the plurality of storage elements $611_1$–$611_n$ provide an external copy of the state of each CAM entry.

The CAM Address Encode circuit 620 is combinatorial logic coupled to the ATU replacement element 610 in order to monitor the contents of each of the plurality of storage elements $611_1$–$611_n$. Typically, this monitoring is performed by reading the contents of the storage elements $611_1$–$611_n$ provided through data lines $615_1$–$615_n$ and then ascertaining if at least one storage element $611_1$, ..., or $611_n$ is not set (e.g., determining if at least one CAM entry is not currently being used for translations). The CAM Address Encode circuit 620 further includes an ATU_Full select line 621 and a number (e.g., $\log_2(n)$) of data input lines 631 (referred to as "E_Num" lines 631) of the select element 630.

Upon detecting at least one storage element that is not set (referred to as an "empty storage element"), the CAM Address Encode circuit 620 performs three operations. Namely, the CAM Address Encode circuit 620 (i) selects the empty storage element, (i) outputs an entry number, which represents the location of the empty storage element in the ATU replacement element 610, to the select element 630 via the E_Num lines 631, and (iii) de-asserts the ATL_Full select line 621. Thereafter, the entry number is transferred through the select element 630 to the CAM Update address lines 530, thereby loading the virtual address of the address translation in an entry of the CAM element corresponding to the entry number. Moreover, the physical address of the address translation is preferably loaded in an entry of the RAM element corresponding to the entry number. However, if there does not exist any empty storage elements, the CAM Address Encode circuit 620 asserts the ATU_Full select line 621 thereby controlling the select element 630 to output a count value produced by the increment circuit 640 as described below.

As further shown, the select element 630 is a multi-input multiplexer, or a group of multi-input multiplexers coupled together to transmit one of a plurality of data inputs. The data inputs of the select element 630 include the entry number via the E_Num lines 631, a "flush entry number" (provided by the flush control circuit 700 of FIG. 7) via input lines 632 (i.e., "Flush" lines), and a count value from the increment circuit 640 via input lines 633 (i.e., "Count" lines). The selection of one of these inputs as the output is controlled by the assertion or de-assertion of the ATU_Full select line 621 by the CAM Address Encode circuit 620 and whether or not the ATU control state machine (not shown) is supporting a flush operation represented by assertion or de-assertion of a Flush Invalidate Update control line 622.

If all of the address translations are actively being used, as signified by the all of the CAM Valid bits for the CAM entries and storage elements $611_1$–$611_n$ of the ATU replacement element 610 being "set", the ATU_Full select line 621 is asserted. Assertion of the ATU_Full select line 621 causes the count value, provided by the increment circuit 640, to be output from the select element 630 through the CAM Update address lines 530. The count value represents which entries of the CAM and RAM elements are to be loaded with the new address translation. The increment circuit 640 includes a "Modulo n" counter 641 which is incremented and enabled when the ATU_Full select line 621 is asserted and a CAM Update command is produced by the ATU control state machine 580 of FIG. 5.

The CAM Address Decode circuit 650 includes combinatorial logic coupled to the select element 630 through a feedback loop 651 in order to update the contents of the ATU replacement element 610 based on a modification to a CAM entry in a prior cycle. This entry modification is represented by the entry number, the flush entry number, or the count value being transmitted through the CAM Update address lines 530. The CAM Address Decode circuit 650 is further coupled to the ATU control state machine (not shown) to monitor when a CAM Update command is asserted via CAM command lines 524, and in response, to assert a clock enable control line $614_1$, . . . , or $614_n$ associated with the storage element $611_1$, . . . , or $611_n$ that corresponds to the CAM entry being updated.

Figure 7:
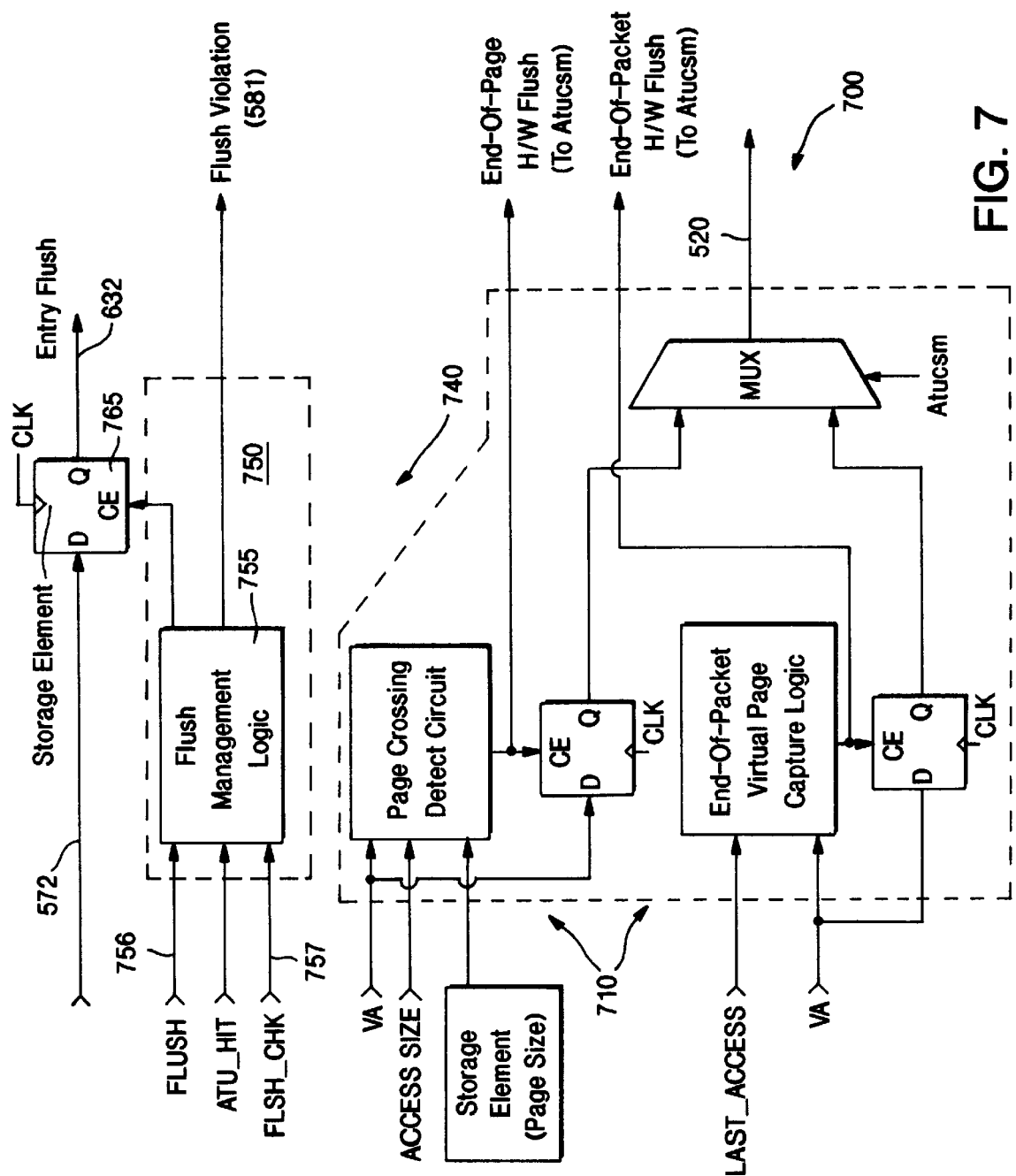

Referring now to FIG. 7, an embodiment of the flush control circuit 700 is shown. The flush control circuit 700 comprises a first circuit 710 coupled to the HW Flush address lines 520 of the ATU and a second circuit 740 coupled to the address lines 522 and the Flush lines 632 (see also FIGS. 5-6). The first circuit 710 is configured to propagate a virtual page number to the CAM upon detection of conditions (e.g., page crossings, end-of-packet, etc.) in which a flush operation by hardware would enhance system performance.

The second circuit 740 is configured to perform two operations; namely, (i) a flush check when enabled and before loading a new translation by the update circuit 600, and (ii) a flush operation on a CAM entry. Flush checking is enabled by setting a flush check bit "FLSH_CHK" in the ATU control register. As mentioned above, the ATU control register may be one of the I/O registers implemented in the slave interface device 410 of the I/O bus interface logic 400 of FIG. 4.

As shown in FIG. 7, the second circuit 740 includes a flush check circuit 750 configured to perform a check on the CAM entries before loading a new address translation. The flush check circuit 750 includes flush management logic 755 configured to temporarily contain a virtual address (e.g., a virtual page number) of the address translation to be loaded. During a flush check operation and if the FLSH_CHK bit is set, the status of which are indicated by signal lines 756–757, the flush management logic 755 activates the select line 581 for the first select element 504 (FIG. 5) in order to allow the virtual page number from the FIFO storage element 514 to flow therethrough. The virtual page number is routed from address lines 599 to the address lines 532 under the control of the ATU control state machine 580.

If the virtual page number is not found in a CAM entry, the new translation is loaded under the usual translation procedure as discussed above. However, if the virtual page number is located upon searching the contents of the CAM entries, the new address translation is not loaded into the CAM entry. Instead, an error signal is generated by the ATU control state machine 580 to the processor via an interrupt line (not shown) or to a register accessible by the processor. The presence of the virtual page number indicates that it was not flushed out by software after a previous establishment of the virtual page-to-physical mapping. If hardware is responsible for flushing the entry by invalidating the entry, the presence of the virtual page number indicates the hardware did not operate appropriately. This indicates that invalid translation has been uncovered causing the error signal to be asserted. It is contemplated that the hardware may include the flush management logic 755 cooperating with a set of storage elements 765 and the update circuit 600 as described in the concurrently filed U.S. patent application entitled "A Circuit and Method for Replacement of Address Translations" (application Ser. No. 08/673,004) incorporated herewith by reference.

An embodiment of the operations of the flush check is described. The flush check is affiliated with a hardware translation load since the virtual address of the new address translation should not be contained in I/O MMU because it is a new virtual-to-physical mapping. If the address is present, it indicates that the virtual address was not "flushed" previously. The flush check may be utilized as a debug operation.

As described, a flush check mode is established by setting the FLSH_CHK bit in the ATU control register. A hardware translation load trigger takes the ATU control state machine out of its idle state. In Step 810, the virtual page number from the FIFO storage element 514 is placed on the $A_{lookup}$ port of the CAM element. A TRANSLATE command is sent to CAM element 500. Next the ATU monitors the CAM_Hit signal. If a CAM_Hit signal is de-asserted, indicating a "lookup miss", there is no further action required and the translation is to be loaded as normal.

However, if the CAM_Hit signal is asserted (e.g., a logic "1"), an "unflushed" translation was found. As a result, the ATU may generate an interrupt to one or more microprocessor(s) of the electronic system which are shown in FIG. 2A. Optionally, the ATU could record the virtual address transferred issuing on lines 562. Additionally, the ATU may generate the interrupt along with recordation of the address translation. Another option is to make the translation an "ATU miss" (e.g., cause the ATU_Hit signal to be de-asserted) so that a virtual address is issued on address lines 516 to the I/O MMU 250. Thus, the I/O MMU 250 is required to handle the error instead of the ATU.

The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follows.

What is claimed is:

1. A network interface circuit comprising:

an address translation unit including a dedicated memory having a plurality of entries to contain a corresponding plurality of address translations; and a flush control circuit coupled to the address translation unit, the flush control circuit including a flush check circuit being configured to determine, prior to loading an address translation into the dedicated memory, whether one of the plurality of entries contains a valid, virtual page number associated with the address translation.

2. The network interface circuit according to claim 1, wherein the flush check circuit includes flush management logic coupled to the address translation unit, the flush management logic being configured to at least detect whether a flush check mode is enabled and output a flush violation signal if one of the plurality of entries contains the valid, virtual page number.

3. The network interface circuit according to claim 2, wherein the flush management logic is coupled to at least one storage element being set to enable the flush check mode.

4. The network interface circuit according to claim 2, wherein the flush violation signal is transmitted to a state machine responsible for handling a flush error.

5. The network interface circuit according to claim 1, wherein the dedicated memory of the address translation unit includes a content addressable memory (CAM) element configured to contain the virtual page number of the address translation, and a random access memory (RAM) element configured to contain a physical page number of the address translation.

6. The circuit according to claim 5, wherein the flush control circuit further includes a circuit configured to propagate the virtual page number to the CAM element upon detection of a condition.

7. The circuit according to claim 6, wherein the condition includes a page crossing.

8. A network system comprising:

a communication media; and first electronic system coupled to the communication media, the first electronic system including a plurality of buses including a first bus and a second bus, at least one microprocessor coupled to the first bus, and a network interface circuit coupled to the second bus and to the communication media, the network interface circuit including an input/output (I/O) bus interface coupled to the second bus, an address translation unit in communication with the I/O bus interface, the address translation unit including a dedicated memory having a plurality of entries to contain a corresponding plurality of address translations, and a flush control circuit coupled to the address translation unit, the flush control circuit including a flush check circuit being configured to determine, prior to loading an address translation into the dedicated memory, whether one of the plurality of entries contains a valid, virtual page number associated with the address translation.

9. The network system according to claim 8, wherein the dedicated memory of the address translation unit includes a content addressable memory (CAM) element configured to contain the virtual page number of the address translation, and a random access memory (RAM) element configured to contain a physical address of the address translation.

10. The network system according to claim 8, wherein the flush check circuit of the network interface circuit includes flush management logic coupled to the address translation unit, the flush management logic being configured to at least detect whether a flush check mode is enabled and output a flush violation signal if one of the plurality of entries contains the valid, virtual page number.

11. The network system according to claim 10, wherein the flush management logic of the flush check circuit is coupled to a control register implemented within the I/O bus interface, the control register being configured to enable the flush check mode when the control register is set.

12. A method for checking for an invalid address translation within memory of an address translation unit of a computer, the method comprising:

determining whether a flush check mode is enabled;

receiving a command from system software of the computer indicating that an address translation is to be loaded into the memory of the address translation unit, the address translation unit operating independently from a memory management unit;

loading a virtual address of the address translation into the memory of the address translation unit; and monitoring a CAM_Hit signal upon receiving the command, wherein performing no further action if the CAM_Hit signal is de-asserted, and handling an error condition if the CAM_Hit signal is asserted.

13. The method according to claim 12, wherein the determining of whether the flush check mode is enabled includes accessing a value of a control register of the address translation unit; and reading the value, wherein the flush check mode is enabled if the value is a first binary value, and the flush check mode is disabled if the value is a second binary value.

14. The method according to claim 12, wherein the handling of the error condition includes transmitting an error signal to at least one microprocessor of the computer.

15. The method according to claim 12, wherein the handling of the error condition includes storing an invalid address translation corresponding to the asserted CAM_Hit signal for recordation and subsequent analysis.

16. The method according to claim 12 wherein the handling of the error condition includes de-asserting a signal causing the virtual address of the address translation to be transmitted to the memory management unit.

17. A network interface circuit comprising:

an asynchronous transfer mode (ATM) core including a segmentation and reassembly (SAR) unit to disassemble incoming ATM cells into a plurality of data packets; and an input/output bus interface logic including:
- an address translation unit to translate a virtual address received from the SAR unit into a predetermined physical address, the address translation unit including memory having a plurality of entries to contain a corresponding plurality of address translations, and
- a flush control circuit coupled to the address translation unit, the flush control circuit including a flush check circuit being configured to determine, prior to loading an address translation for the virtual address into the memory, whether one of the plurality of entries contains a valid, virtual address identical to the virtual address provided by the SAR unit.

18. The network interface circuit according to claim 17, wherein the memory of the address translation unit includes a content addressable memory (CAM) element configured to contain the virtual address of the address translation, and a random access memory element (RAM) configured to contain the predetermined physical address of the address translation.

19. The network interface circuit according to claim 17, wherein the flush check circuit of the input/output bus interface logic includes
- flush management logic coupled to the address translation unit, the flush management logic being configured to at least detect whether a flush check mode is enabled and output a flush violation signal if one of the plurality of entries contains the virtual address.

* * * * *